United States Patent
Ledford et al.

Patent Number: 5,406,604
Date of Patent: Apr. 11, 1995

[54] TWO PART TIE PLATE ADAPTED TO D & C LATTICE

[75] Inventors: Kevin L. Ledford, Wilmington; Eric B. Johansson, Wrightsville Beach, both of N.C.

[73] Assignee: General Electric Company, San Jose, Calif.

[21] Appl. No.: 154,067

[22] Filed: Nov. 18, 1993

[51] Int. Cl.6 .................................. G21C 1/04
[52] U.S. Cl. .............................. 376/352; 376/448
[58] Field of Search ............... 376/352, 353, 448, 447, 376/267

[56] References Cited

U.S. PATENT DOCUMENTS

| | | | |
|---|---|---|---|
| 3,878,870 | 4/1975 | Atherton et al. | 138/42 |
| 4,069,102 | 1/1978 | Berringer et al. | 376/463 |
| 4,492,668 | 1/1985 | Pilgrim, Jr. et al. | 376/440 |
| 4,560,532 | 12/1985 | Barry et al. | 376/434 |
| 4,655,995 | 4/1987 | Freeman et al. | 376/267 |
| 4,707,328 | 11/1987 | Arbink et al. | 376/446 |
| 4,767,595 | 8/1988 | Wolters, Jr., et al. | 376/353 |
| 4,826,653 | 5/1989 | Nylund et al. | 376/444 |
| 5,030,412 | 7/1991 | Yates et al. | 376/352 |
| 5,037,605 | 8/1991 | Riordan, III | 376/352 |
| 5,100,611 | 3/1992 | Nylund | 376/352 |
| 5,106,575 | 4/1992 | Nakamura et al. | 376/439 |
| 5,219,517 | 6/1993 | Nylund | 376/352 |
| 5,230,861 | 7/1993 | Nylund | 376/439 |
| 5,251,246 | 10/1993 | Matzner | 376/444 |
| 5,282,231 | 1/1994 | Adams et al. | 376/352 |

FOREIGN PATENT DOCUMENTS

62-96891  5/1987  Japan.

Primary Examiner—Donald P. Walsh
Assistant Examiner—Meena Chelliah
Attorney, Agent, or Firm—J. E. McGinness

[57] ABSTRACT

A two part lower tie plate assembly is disclosed for use with a fuel bundle of a boiling water nuclear reactor. The two parts include a rod supporting grid section and nozzle section. Both the rod supporting grid section and the nozzle section are constructed asymmetrically. The rod supporting grid section contains one half of the total offset required for a D lattice lower tie plate and the nozzle section contains one half of the total offset required for a D lattice lower tie plate. When a D lattice lower tie plate is required, assembly occurs so that the offsets are additive. When a C lattice lower tie plate is required, assembly occurs that the offsets are subtractive. Assembly of the lower tie plate is provided be either bolting or welding. There results on single rod supporting grid and nozzle section components capable of assembly to fit either a C or a D lattice.

10 Claims, 9 Drawing Sheets

TWO PART TIE PLATE ADAPTED TO D & C LATTICE

This invention relates to fuel bundles for boiling water nuclear reactors. More particularly, this invention discloses a two part lower tie plate for supporting the fuel bundle on the fuel support casting, this particular tie plate having the ability to be assembled to accommodate either a so-called "D" or a "C" lattice.

BACKGROUND OF THE INVENTION

This invention relates to lower tie plates for nuclear fuel bundles. In order to understand this invention, the construction of a nuclear fuel bundle will be first summarized. Thereafter, the support of fuel bundles on the fuel support casting interior of a nuclear reactor will be set forth. Finally, the difference between the so-called "D" and "C" lattices will be discussed—emphasizing the "D" lattice mounting as non-symmetrical and the "C" lattice mounting as symmetrical. This summary will set the background required to understand the subject two part tie plate construction which can accommodate both "D" and "C" lattices.

For purposes of this invention, the construction of a nuclear fuel bundle can be easily summarized. It includes a lower tie plate supporting an upstanding, vertical, side-by-side array of sealed fuel rods at a rod supporting grid. This lower tie plate functions to admit moderating water coolant into the fuel bundle.

The vertical fuel rods are bound in side-by-side relationship by so-called fuel rod spacers with the bundle terminating in an upper tie plate. This upper tie plate allows the water moderator and generated steam to escape from the fuel bundle. Additionally, using certain of the fuel rods also referred to as "tie rods", the upper and lower tie plates are held together making the fuel bundle a unitary assembly which can be moved to and from locations in the reactor.

Finally, the fuel bundle is surrounded by a fuel bundle channel which extends from the vicinity of the lower tie plate to the vicinity of the upper tie plate. This channel assures that the two phase flow of water and steam through the fuel bundle is separated from the so-called surrounding "core bypass" region which is normally filled with water. This same core bypass region is the region in which the so-called "control rods" pass to absorb neutrons and control the nuclear reaction within the fuel rods.

Having summarized fuel bundle construction, a simplified explanation of the support of the fuel bundles may now be offered.

Fuel bundles interior of a nuclear reactor are supported in groups of four on fuel support castings. Such support occurs at each fuel bundle at the lower tie plate. The fuel support casting distributes the moderating water coolant to the lower tie plates and is provided with a central aperture through which the control rod moves into and out of the interstitial space between the fuel bundle. When the control rod is out of the interstitial space between the fuel bundles, water occupies the control rod interval and assists in promoting the nuclear reaction within the supported fuel bundles. When the control rod is in the interstitial space between the fuel bundles, water is displaced in the control rod interval and the control rod absorbs neutrons.

Having given the simplified explanation of the support of the fuel bundles, the difference between the "D" and "C" lattices can now be set forth.

In certain boiling water nuclear reactors, the spacial interval between adjacent fuel bundles was non-uniform. Taking the case of adjacent fuel bundles, if the space between the fuel bundles was one into which a control rod passed, a "large" separation between the fuel bundles was provided. If the space between the fuel bundles was one into which a control rod did not penetrate, a "small" separation between the fuel rods was provided. These boil water nuclear reactors were referred to as "D" lattice reactors.

It will be understood that the terms large and small as used herein are relative. In actual fact, the change in spatial interval was quite small—being in the order of 0.040 of an inch parallel to the sides of the fuel bundles. This change in spacing was provided by an eccentricity built into the lower tie plate. That eccentricity can be easily understood.

Lower tie plates have a nozzle section which directly rests upon the core support casting. In a D lattice lower tie plate, this nozzled section was offset with respect to the rod supporting grid section of the tie plate. This offset occurred away from the centerline of the fuel bundle supporting casting. The spatial interval between fuel bundles where the control rod penetrated was larger than the smaller spatial interval between fuel bundles where the control rod did not penetrate.

In later boiling water nuclear reactors, this eccentricity of mounting the fuel bundles was abandoned. In a so-called "C" latticed lower tie plate, this nozzled section was concentric with respect to the rod supporting grid section of the tie plate. No offset occurred away from the centerline of the core support casting. The spatial interval between fuel bundles where the control rod penetrated was the same as the spatial interval between fuel bundles where the control rod did not penetrate.

SUMMARY OF THE PRIOR ART

In the past, an attempt to accommodate both C and D lattice lower tie plates has been made. Specifically, a tie plate was constructed which was in D lattice configuration. When use in the C lattice was required, the tie plate was machined to accommodate the C lattice.

RELEVANT DISCLOSURE (NOT PRIOR ART)

Recently, there has arisen the need to place various kinds of debris strainer within the lower tie plate. Specifically, between the nozzle inlet to the lower tie plate and the rod supporting grid, there is a plenum region through which the water moderator admitted to the lower tie plate flows. In previous disclosures of the common assignee of this application, it has been proposed to make the lower tie plate a two part assembly with a nozzle section and a rod supporting grid section. This two part lower tie plate then allows the insertion of a debris filter within the plenum region of the lower tie plate.

SUMMARY OF THE INVENTION

A two part lower tie plate assembly is disclosed for use with a fuel bundle of a boiling water nuclear reactor. The two parts include a rod supporting grid section and nozzle section. The grid section incudes an upwardly exposed grid for supporting fuel rods and a plenum defining lower portion. The nozzle section includes a lower nozzle inlet and a plenum defining upper portion. Both the rod supporting grid section and the nozzle section are constructed so that they may be put together asymmetrically. The rod supporting grid section contains one half of the total offset required for a D lattice lower tie plate and the nozzle section contains one half of the total offset required for a D lattice lower tie plate. When a D lattice lower tie plate is required, assembly occurs so that the offsets are additive. When a C lattice lower tie plate is required, assembly occurs that the offsets are subtractive. Assembly of the lower tie plate is provided by either bolting or welding. There results single rod supporting grid and nozzle section components capable of assembly to fit either a C or a D lattice.

BRIEF DESCRIPTION OF THE DRAWINGS

Other objects, features and advantages of this invention will be more apparent after referring to the following specification and attached drawings in which:

FIG. 6A-6B are respective bottom plan views of the tie plate of this invention in which FIG. 6A illustrates the D lattice configuration and FIG. 6B illustrates the C lattice configuration; and;

DESCRIPTION OF THE PREFERRED EMBODIMENT

Figure 1:
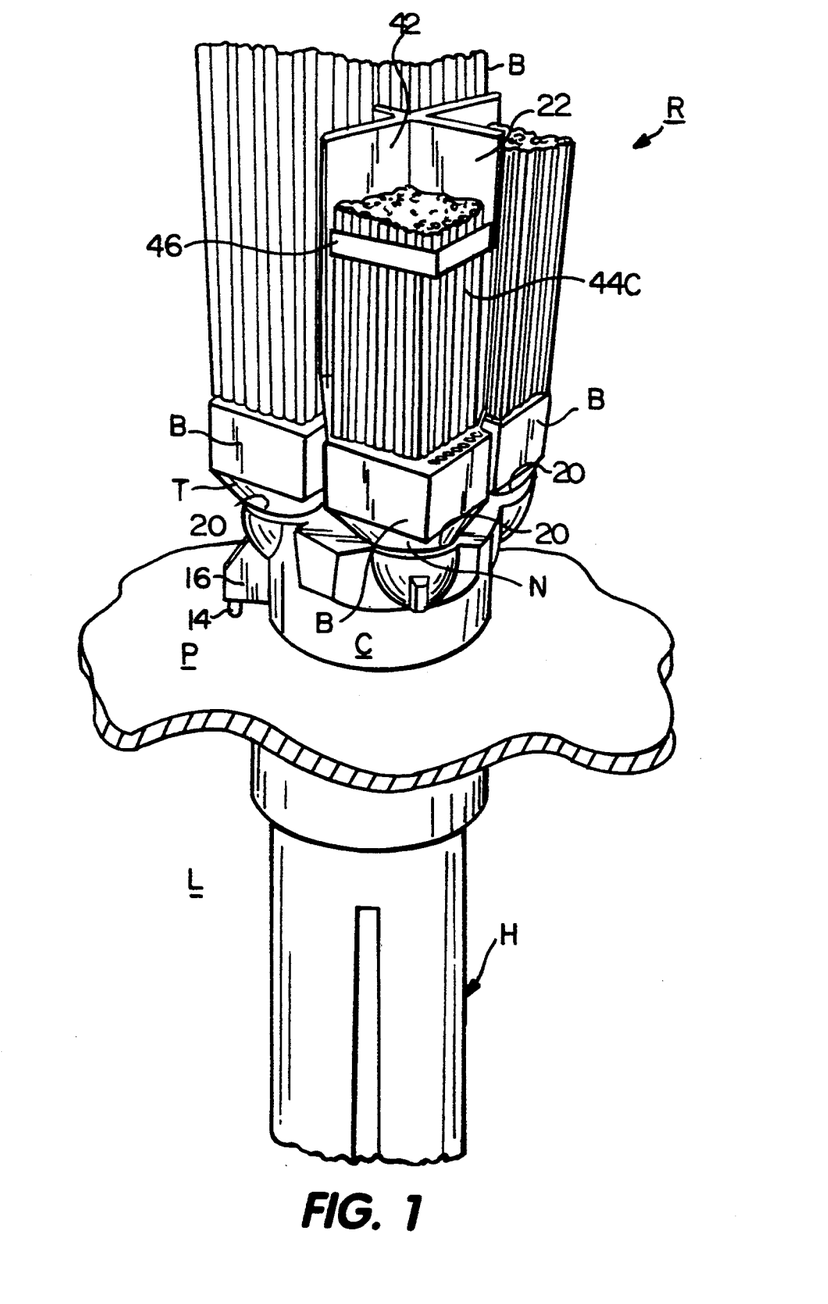
FIG. 1 is a perspective view of a boiling water reactor core in which four side-by-side fuel bundles are supported on a fuel support casting, this support being common to both D and C lattice configurations.

Referring to FIG. 1, a pertinent detail of a portion of a reactor core is shown. Control rod drive housing H has fuel support casting C supported thereon. Fuel support casting C includes arm 16 which orients casting C with respect to pin 14 in core plate P.

Core plate P divides high pressure lower plenum L from core R, preserving the necessary pressure differential barrier to cause the controlled circulation within the many individual fuel bundles of the reactor.

Fuel support casting C includes four apertures 20 onto which four fuel bundles B at their respective lower tie plate assemblies T are placed. Each lower tie plate assembly T is disposed to cause its inlet nozzle N to communicate to one of the apertures 20 of the fuel support casting.

Fuel support casting C also includes apertures through which control rods 22 penetrate to the interstices of the four fuel bundles sitting on top of the fuel support casting C. Since the action of the control rods is not important with respect to this invention, further discussion of this aspect of the reactor will not be included.

It will be understood that the above illustration is equally applicable to the D lattice or C lattice construction illustrated. In the following discussion, emphasis will be made to these particular constructions. Dimensions will be exaggerated in order to impart understanding to the invention.

Figure 2A:
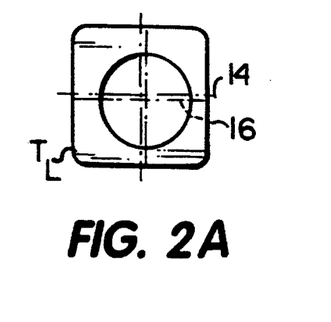
FIGS. 2A-2B are respective tie plate and fuel support casting and tie plate schematics illustrating a D lattice configuration.

Referring to FIG. 2A, a schematic of the lower tie plate $T_L$ is illustrated. Fuel bundle center line 14 is shown centered with respect to the illustrated structure. Nozzle support centerline 16 is shown offset.

Total offset is in the order of 0.040 of an inch in the horizontal (X) and vertical (Y) direction for a total diagonal offset of 0.057 inches.

Figure 3A:
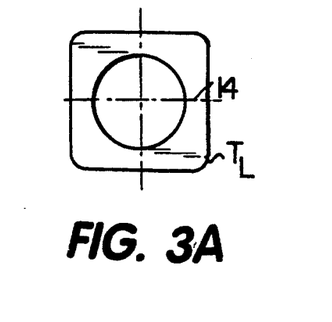
FIGS. 3A-3B are respective tie plate and fuel support casting and tie plate schematics illustrating a C lattice configuration.

Referring to FIG. 3A, a schematic of the lower tie plate $T_L$ is illustrated. Fuel bundle center line 14 is shown centered with respect to the illustrated structure. Nozzle support centerline is coincident—and therefore not illustrated.

Figure 2B:
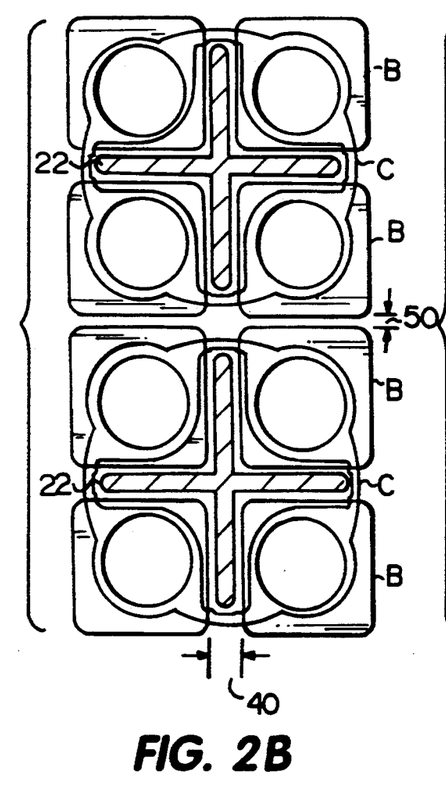

Referring to FIG. 2B, two fuel support castings C are each shown to illustrate the differential spacings of the D lattice fuel bundles.

First, and as between all fuel bundles having a control rod 22 penetrating in the interstices between the fuel bundles, a D lattice has a larger spacing, this spacing being in the order of 0.75 inches. Second, and as between all fuel bundles having no control rod penetrating in the interstices, a D lattice has a narrower spacing, this spacing being in the order of 0.37 inches.

Figure 3B:
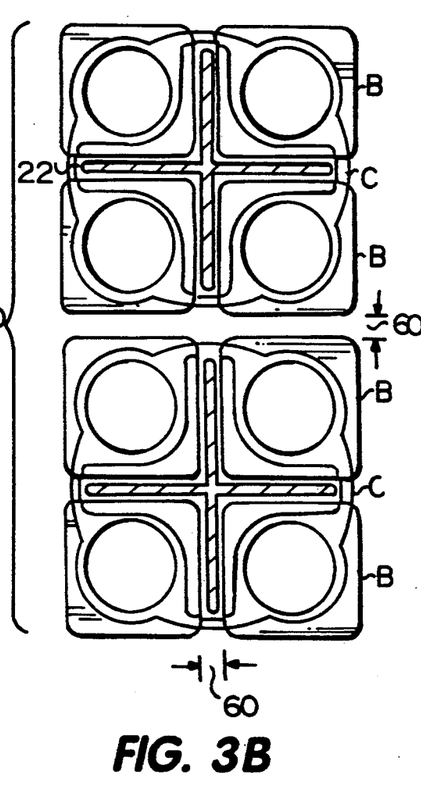

Referring to FIG. 3B, two fuel support castings C are each shown, illustrating the constant and unchanging spacings of the C lattice fuel bundles.

First, and as between all fuel bundles having a control rod 22 penetrating in the interstices between the fuel bundles, a C lattice has constant spacing 60—whether or not a control rod penetrates between the interstices of the fuel bundles.

Figure 4A:
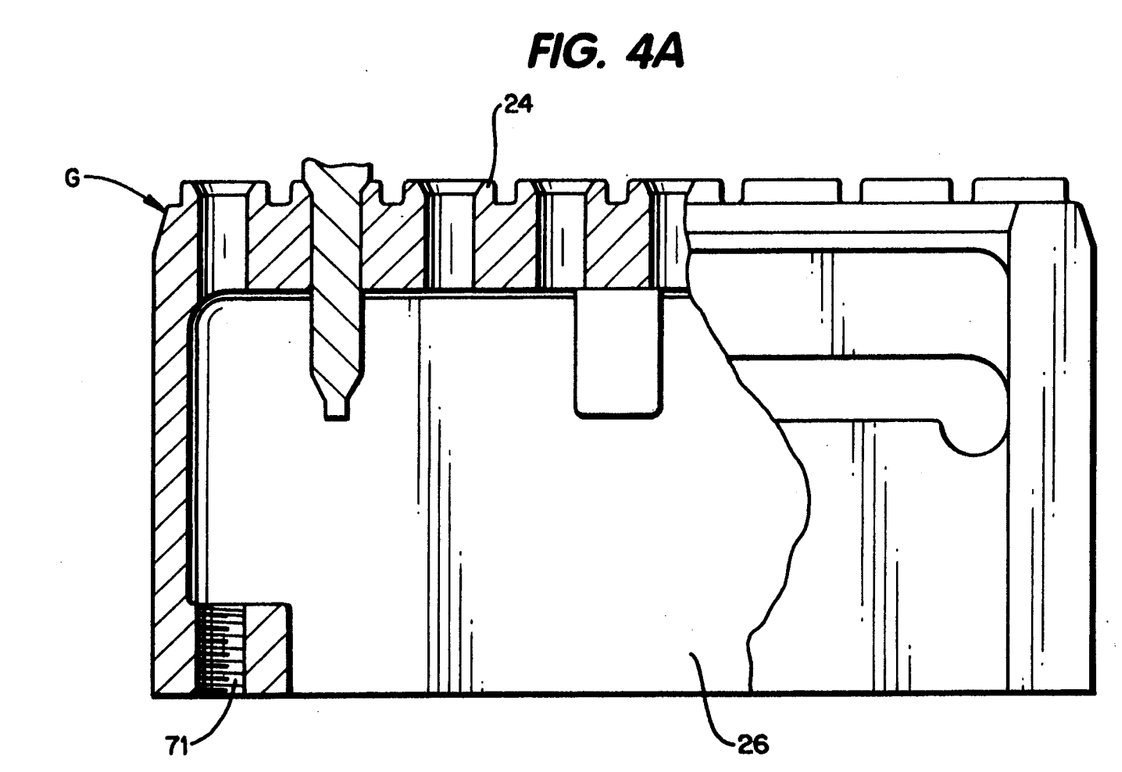
FIG. 4A-4C are respective side elevation, top plan and bottom plan views of the rod supporting grid section of the two part lower tie plate of this invention.
Figure 4B:
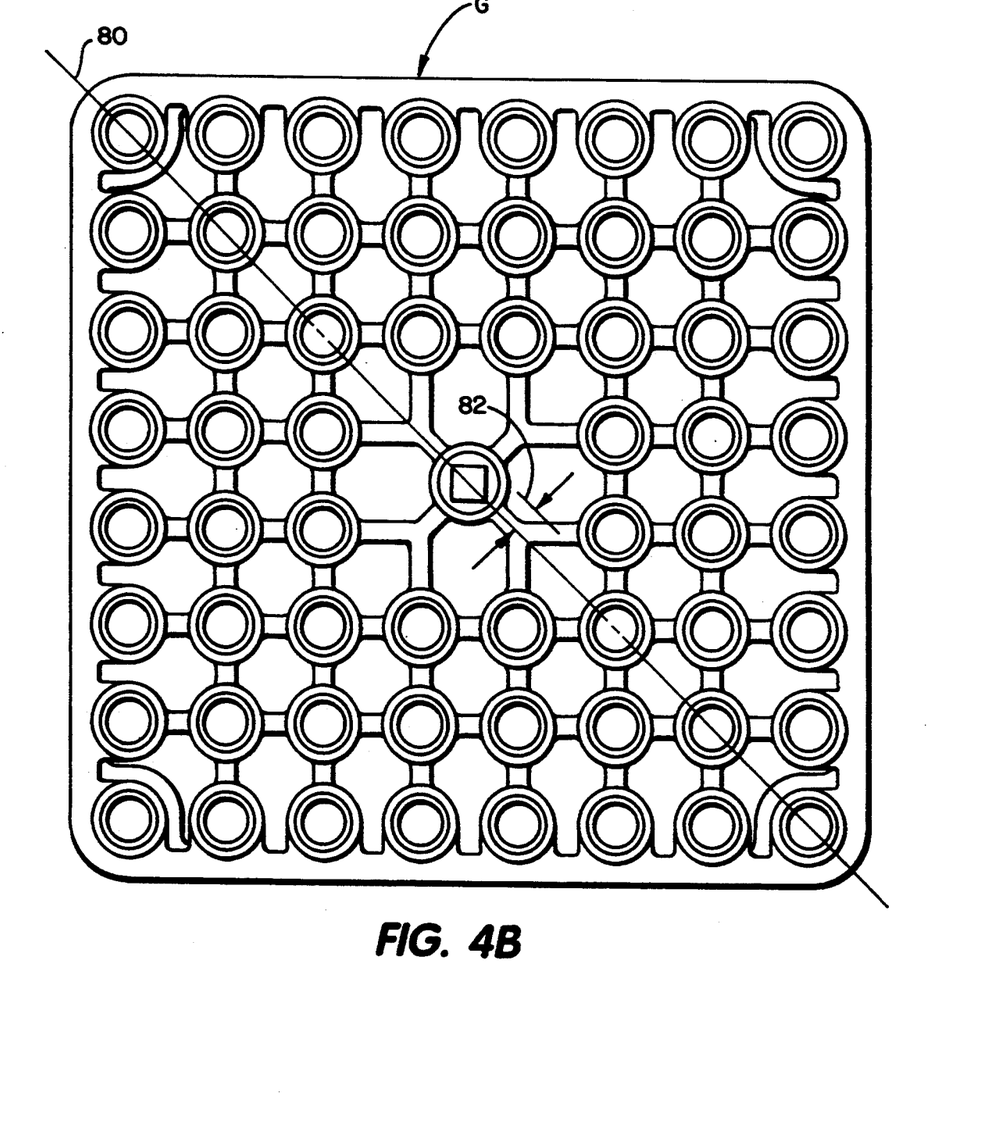
Figure 4C:
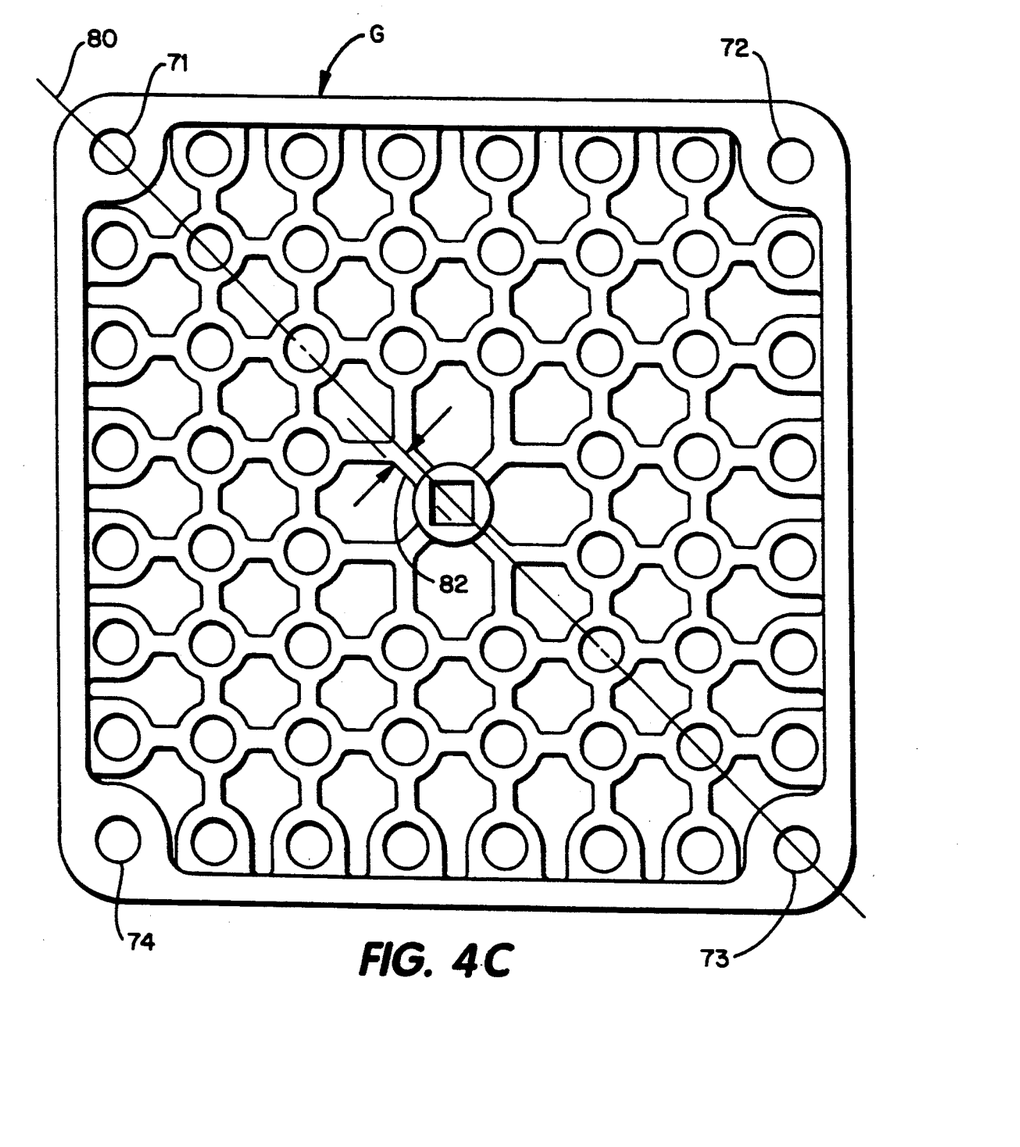
Figure 5A:
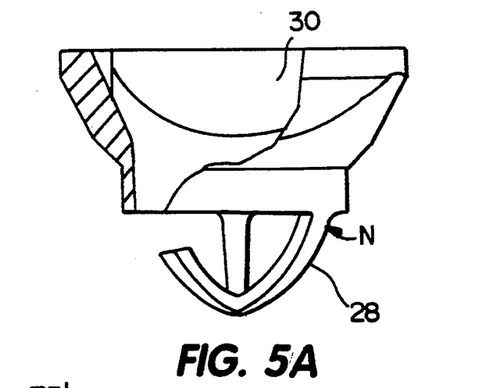
FIGS. 5A-5D are respective side elevation partial sections (FIGS. 5A and 5B), top plan and bottom plan views of the nozzle section of the two part lower tie plate of this invention.
Figure 5B:
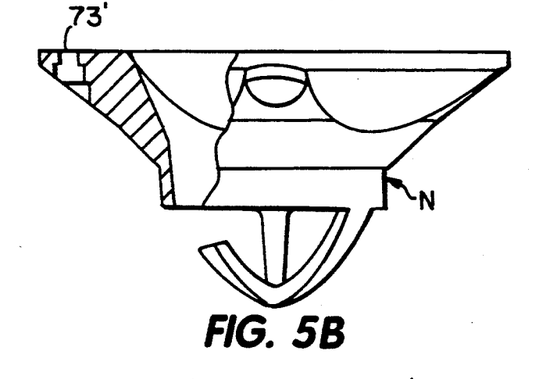
Figure 5C:
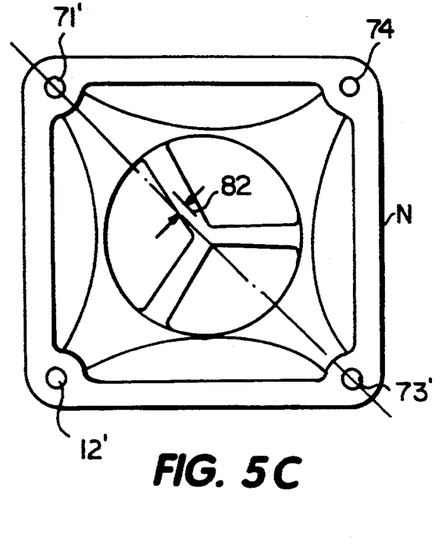
Figure 5D:
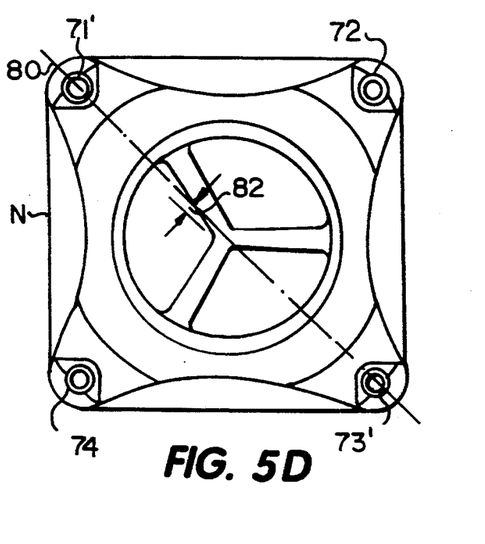

Referring to FIGS. 4A, 4B, and 4C, the rod supporting grid section G of the lower tie plate (including an upwardly exposed grid 24 and a plenum defining lower portion 26) is shown having bolt holes 71-74. As can be seen in the top and bottom plan views of respective FIGS. 4B and 4C, bolt holes 71, 73 are asymmetrical with respect to diagonal 80 to accommodate one half ($\frac{1}{2}$) of the offset 82 required of a D lattice lower tie plate— this being in the order of 0.0285 of an inch.

Referring to FIGS. 5A-5D, the nozzle section N of the lower tie plate (including lower nozzle inlet 28 and a plenum defining upper portion 30) is shown having bolt holes 71'-74'. As can be seen in the top and bottom plan views of respective FIGS. 5C and 5D, bolt holes 71', 73' are asymmetrical with respect to diagonal 80 to accommodate one half ($\frac{1}{2}$) of the offset 82 required of a D lattice lower tie plate—this being in the order of 0.0285 of an inch.

Figure 6A:
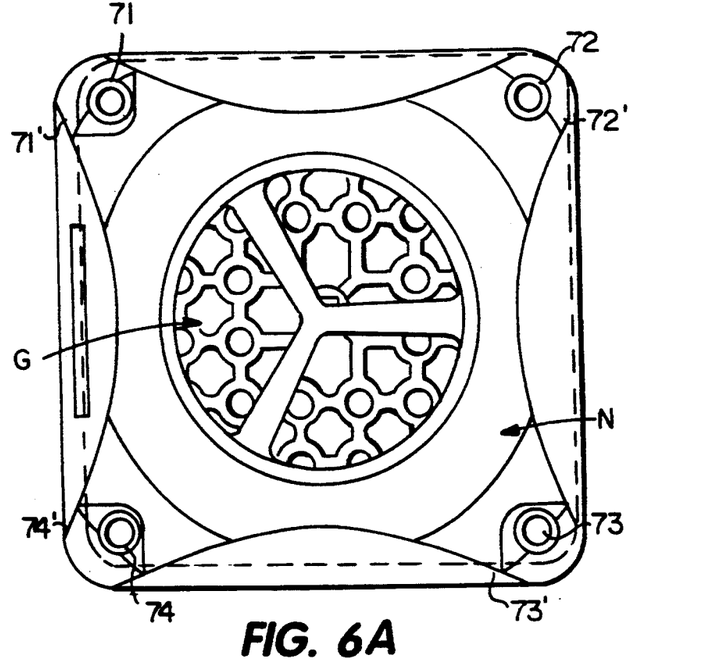

Referring to FIG. 6A, nozzle section N and rod supporting grid section G are shown assembled in a D lattice configuration. In this configuration, the offsets are additive. Specifically, holes 71, 71'; 72, 72'; 73, 73'; and 74, 74' are all assembled one on top of another so that the offsets are additive. Displacement of nozzle N with respect to rod supporting grid section G of the lower tie plate occurs.

Figure 6B:
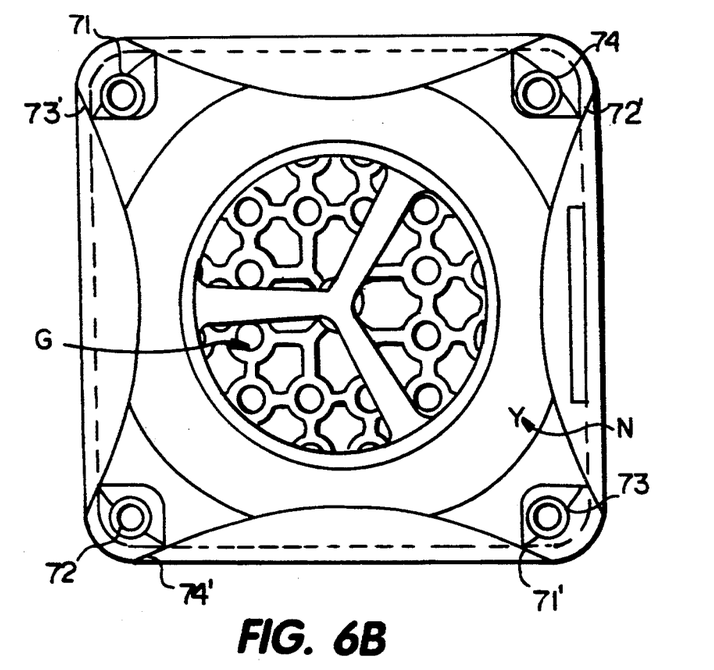

Referring to FIG. 6b, nozzle section N and rod supporting grid section G are shown assembled in a C lattice configuration. In this configuration, the offsets are subtractive. Specifically, holes 71, 73'; 72, 74'; 73, 71'; and 74, 71' are all assembled one on top of another so that the offsets are subtractive. Displacement of nozzle N with respect to rod supporting grid section G of the lower tie plate does not occur.

Figure 7A:
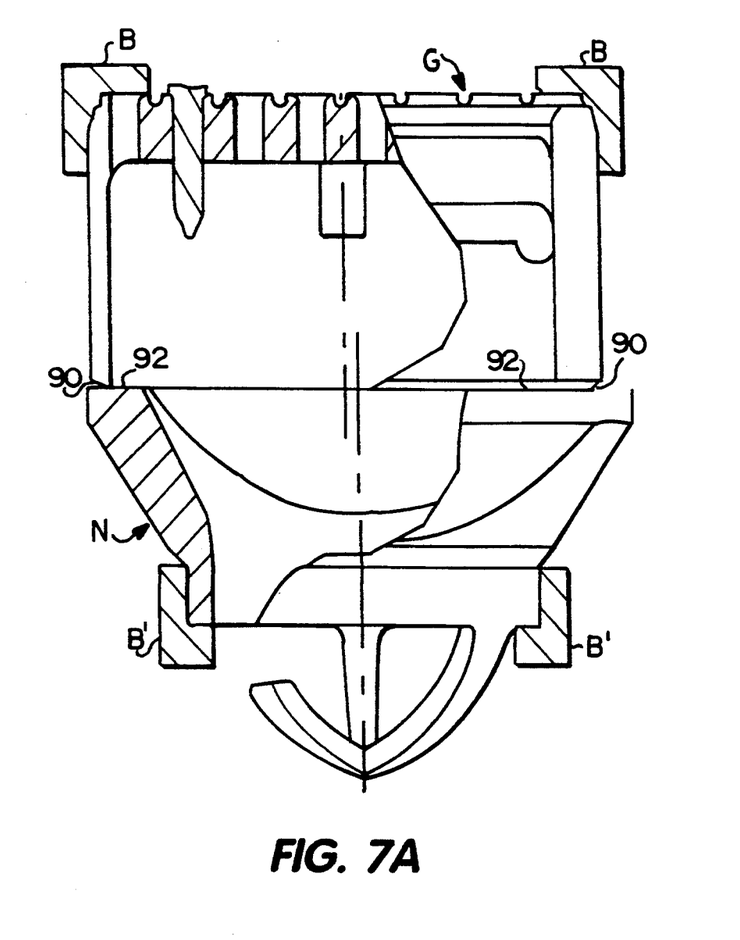
FIG. 7A and 7B are respective side elevation sections showing the welded assembly of the nozzle section and rod supporting grid section of the lower tie plate with FIG. 7A illustrating the D lattice assembly and FIG. 7B illustrating the C lattice assembly.
Figure 7B:
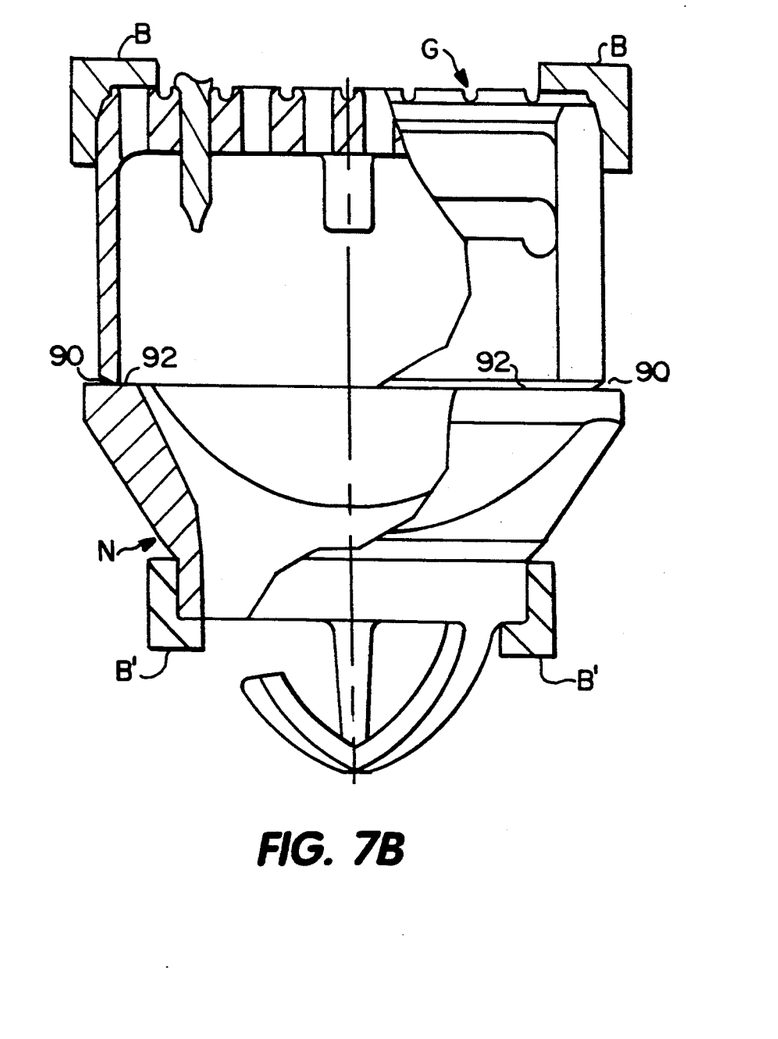

Referring to FIGS. 7A and 7B, the easier case where the respective lower tie plate sections N and G are assembled by welding is illustrated. In this case, both nozzle section N and rod supporting grid section G are assembled with weld supporting fillets 90. The interface 92 between the respective sections is made with sufficient breath that accommodation of the D lattice configuration or the C lattice configuration can occur. What occurs is that a brace B' and B secures holds the respective sections G and N during welded assembly. In the case of FIG. 7A, bracing occurs in the D lattice configuration; in the case of FIG. 7B, bracing occurs in the C lattice configuration.

It will be understood that this invention will admit of modification. For example, any means of fastening between the two illustrated tie plate sections N and G can be utilized.

What is claimed is:

1. A two part lower tie plate assembly comprising in combination:
    a rod supporting grid section having an upwardly exposed grid for supporting fuel rods and discharging moderating water coolant and plenum defining lower portion;
    a nozzle section having a lower nozzle inlet and a plenum defining upper portion for mating with the lower plenum defining section of said rod supporting grid section;
    said rod supporting grid section constructed to accommodate one half of a total offset required for a D lattice lower tie plate;
    said nozzle section constructed to accommodate a remaining one half of the total offset required for a D lattice lower tie plate, whereby when a D lattice lower tie plate is required, assembly of said rod supporting grid section and said nozzle section occurs so that the one half offsets are additive and when a C lattice lower tie plate is required, assembly occurs so that the offsets are subtractive; and,
    means for joining said rod supporting grid section and said nozzle section to form said lower tie plate as either a D lattice lower tie plate or as a C lattice lower tie plate.

2. A two part lower tie plate assembly according to claim 1 and wherein:
    said means for joining said rod supporting grid section and said nozzle section to form said lower tie plate includes welding.

3. A two part lower tie plate assembly according to claim 1 and wherein:
    said means for joining said rod supporting grid section and said nozzle section to form said lower tie plate includes bolts.

4. A two part lower tie plate assembly according to claim 3 and wherein:
    said bolts extend from said nozzle section to and towards said rod supporting grid section of said lower tie plate.

5. A nuclear fuel bundle for a boiling water nuclear reactor comprising in combination:
    a two part lower tie plate assembly including;
    a rod supporting grid section having an upwardly exposed grid for supporting fuel rods and discharging moderating water coolant and a plenum defining lower portion;
    a nozzle section having a lower nozzle inlet section and a plenum defining upper portion for mating with the plenum defining lower portion of said rod supporting grid section;
    said rod supporting grid section constructed to accommodate one half of a total offset required for a D lattice lower tie plate;
    said nozzle section constructed to accommodate a remaining one half of the total offset required for a D lattice lower tie plate whereby when a D lattice lower tie plate is required, assembly occurs so that the offsets are additive and when a C lattice lower tie plate is required, assembly occurs so that the offsets are subtractive; and,
    means for joining said rod supporting grid section and said nozzle section to form said lower tie plate;
    a plurality of parallel, upstanding fuel rods supported on said rod supporting grid; and,
    an upper tie plate fastened to said lower tie plate through at least some of said fuel rods and defining a spatial interval for discharging moderating water and steam from said fuel bundle.

6. A nuclear fuel bundle for a boiling water nuclear reactor according to claim 5 and wherein:
    said fuel bundle includes a channel extending from the vicinity of said lower tie plate to the vicinity of said upper tie plate.

7. A nuclear fuel bundle for a boiling water nuclear reactor according to claim 5 and wherein:
    said means for joining said rod supporting grid section and said nozzle section to form said lower tie plate includes welding.

8. A process of assembling a two part lower tie plate assembly comprising in combination:
    providing a rod supporting grid section having an upwardly exposed grid for supporting fuel rods and discharging moderating water coolant and a plenum defining lower portion, said rod supporting grid section constructed to accommodate one half of a total offset required for a D lattice lower tie plate;
    providing a nozzle section having a lower nozzle inlet section and a upper plenum defining upper portion for mating with the plenum defining lower portion of said rod supporting grid section, said nozzle section constructed to accommodate a remaining one half of the total offset required for a D lattice lower tie plate whereby when a D lattice lower tie plate is required, assembly occurs so that the offsets are additive and when a C lattice lower tie plate is required, assembly occurs so that the offsets are subtractive; and,
    joining said rod supporting grid section and said nozzle section to form said lower tie plate.

9. A process of assembling a two part lower tie plate assembly according to claim 8 and wherein said assembly includes:
    joining said rod supporting grid section and said nozzle section to form said lower tie plate in a D lattice configuration where said offsets are additive.

10. A process of assembling a two part lower tie plate assembly according to claim 8 and wherein said assembly includes:
    joining said rod supporting grid section and said nozzle section to form said lower tie plate in a C lattice configuration where said offsets are subtractive.

* * * * *